US011687870B2

(12) United States Patent
Phillips et al.

(10) Patent No.: US 11,687,870 B2
(45) Date of Patent: *Jun. 27, 2023

(54) INTELLIGENCE PLATFORM FOR SCHEDULING PRODUCT PREPARATION AND DELIVERY

(71) Applicant: Capital One Services, LLC, McLean, VA (US)

(72) Inventors: Jeremy Phillips, Brooklyn, NY (US); Zhe Liu, McLean, VA (US); Kurry Tran, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/249,708

(22) Filed: Mar. 10, 2021

(65) Prior Publication Data
US 2021/0201259 A1    Jul. 1, 2021

Related U.S. Application Data

(63) Continuation of application No. 16/195,111, filed on Nov. 19, 2018, now Pat. No. 10,963,832, which is a
(Continued)

(51) Int. Cl.
*G06Q 10/08* (2023.01)
*G06Q 10/06* (2023.01)
(Continued)

(52) U.S. Cl.
CPC ... *G06Q 10/0834* (2013.01); *G06Q 10/06311* (2013.01); *G06Q 10/083* (2013.01);
(Continued)

(58) Field of Classification Search
None
See application file for complete search history.

(56) References Cited

U.S. PATENT DOCUMENTS 5,524,077 A    6/1996  Faaland et al.
7,233,907 B2   6/2007  Young et al.
(Continued)

FOREIGN PATENT DOCUMENTS

WO       2017024344 A1    2/2017

OTHER PUBLICATIONS

Roberts, G., "Metro can order dinner online," The Times—Transcript [Moncton, N.B.] Aug. 19, 2013, p. A.1. (Year: 2013).*
(Continued)

*Primary Examiner* — Nicholas D Rosen
(74) *Attorney, Agent, or Firm* — Harrity & Harrity, LLP

(57) ABSTRACT

A device may receive a request for a product. Based on the request, the device may determine a geographic location and delivery time for delivery of the product, and the device may identify product locations that are capable of providing the product and located near the geographic location. The device may determine, for each of the product locations and based on the product and at least one product location characteristic, a fulfillment time indicating when the product will be prepared for delivery. In addition, the device may identify at least one potential courier capable of transporting the product. Based on the fulfillment time, the delivery time, the geographic location for delivery, and at least one courier characteristic associated with the potential courier, the device may select a particular product location and a particular courier and perform an action based on the particular product location or the particular courier.

20 Claims, 5 Drawing Sheets

Related U.S. Application Data continuation of application No. 15/836,589, filed on Dec. 8, 2017, now Pat. No. 10,163,070.

(51) Int. Cl.
| | |
|---|---|
| *G06Q 30/06* | (2023.01) |
| *G06Q 50/28* | (2012.01) |
| *G06Q 10/0834* | (2023.01) |
| *G06Q 30/0601* | (2023.01) |
| *G06Q 10/083* | (2023.01) |
| *G06Q 10/0631* | (2023.01) |
| *G06Q 10/087* | (2023.01) |
| *G06N 20/00* | (2019.01) |

(52) U.S. Cl.
CPC ....... *G06Q 10/087* (2013.01); *G06Q 30/0635* (2013.01); *G06Q 30/0639* (2013.01); *G06N 20/00* (2019.01); *G06Q 30/0601* (2013.01); *G06Q 50/28* (2013.01)

(56) References Cited

U.S. PATENT DOCUMENTS

| | | | |
|---|---|---|---|
| 7,257,552 B1 | 8/2007 | Franco et al. | |
| 8,001,017 B1 | 8/2011 | Franco et al. | |
| 8,473,425 B1 | 6/2013 | Maurer et al. | |
| 9,536,216 B1 * | 1/2017 | Lisso | B65B 43/00 |
| 9,672,064 B2 | 6/2017 | Gupta et al. | |
| 10,007,941 B1 | 6/2018 | Liu | |
| 10,133,995 B1 * | 11/2018 | Reiss | G06Q 50/12 |
| 10,136,288 B2 | 11/2018 | Swanson et al. | |
| 10,163,070 B1 | 12/2018 | Phillips et al. | |
| 10,467,579 B1 * | 11/2019 | Reiss | G06Q 10/0833 |
| 10,776,842 B2 | 9/2020 | Liu | |
| 10,783,482 B2 | 9/2020 | Phillips | |
| 10,885,479 B1 * | 1/2021 | Reiss | G06Q 10/083 |
| 10,963,832 B2 * | 3/2021 | Phillips | G06Q 10/087 |
| 2002/0013734 A1 | 1/2002 | Bueno et al. | |
| 2002/0103724 A1 | 8/2002 | Huxter et al. | |
| 2004/0009769 A1 | 1/2004 | Yokoyama | |
| 2004/0030604 A1 * | 2/2004 | Young | G06Q 30/02 |
| | | | 705/307 |
| 2006/0136237 A1 | 6/2006 | Spiegel et al. | |
| 2009/0089185 A1 | 4/2009 | Noures et al. | |
| 2011/0106613 A1 | 5/2011 | Felt et al. | |
| 2011/0161203 A1 | 6/2011 | Florence et al. | |
| 2011/0288958 A1 | 11/2011 | Obasanjo et al. | |
| 2012/0191551 A1 | 7/2012 | Lutnick et al. | |
| 2012/0203619 A1 | 8/2012 | Lutnick et al. | |
| 2014/0108188 A1 | 4/2014 | Comstock et al. | |
| 2014/0278635 A1 | 9/2014 | Fulton et al. | |
| 2014/0297470 A1 | 10/2014 | Ramadge et al. | |
| 2014/0324725 A1 | 10/2014 | Edmonds et al. | |
| 2015/0170254 A1 * | 6/2015 | Van Biljon | G06Q 30/06 |
| | | | 705/26.81 |
| 2015/0310388 A1 | 10/2015 | Jamthe et al. | |
| 2016/0171584 A1 | 6/2016 | Cao et al. | |
| 2016/0328669 A1 | 11/2016 | Droege et al. | |
| 2017/0017521 A1 * | 1/2017 | Gupta | G06F 9/5016 |
| 2017/0024804 A1 | 1/2017 | Tepfenhart, Jr. et al. | |
| 2017/0116566 A1 | 4/2017 | Walton et al. | |
| 2017/0185961 A1 | 6/2017 | Shiryan et al. | |
| 2017/0287052 A1 | 10/2017 | High et al. | |
| 2017/0308852 A1 | 10/2017 | Beach-Drummond et al. | |
| 2017/0344945 A1 | 11/2017 | Hennessy et al. | |
| 2017/0352004 A1 | 12/2017 | McHale et al. | |
| 2018/0025318 A1 | 1/2018 | Baggott et al. | |
| 2018/0109908 A1 * | 4/2018 | Swanson | H04W 64/006 |
| 2018/0330320 A1 * | 11/2018 | Kohli | G06Q 50/28 |
| 2019/0180231 A1 | 6/2019 | Phillips et al. | |

OTHER PUBLICATIONS

Anon, "Foodmandu: Quenching the Foodie in You," Republika, Kathmandu, Mar. 8, 2017, 2 pages.

\* cited by examiner

INTELLIGENCE PLATFORM FOR SCHEDULING PRODUCT PREPARATION AND DELIVERY

RELATED APPLICATIONS

This application is a continuation of U.S. patent application Ser. No. 16/195,111, filed Nov. 19, 2018, which is a continuation of U.S. patent application Ser. No. 15/836,589, filed Dec. 8, 2017 (now U.S. Pat. No. 10,163,070), which are incorporated herein by reference in their entireties.

BACKGROUND

Consumers may order and obtain products in a variety of ways. For example, a consumer may order and/or purchase a product by visiting a physical retail location site where products are stored and/or sold. Alternatively, a consumer may order and/or purchase a product online, by phone, by mail, or the like, for delivery of the product to the consumer via a carrier, such as a postal service.

SUMMARY

According to some implementations, a device may comprise: one or more memories; and one or more processors, communicatively coupled to the one or more memories, to: receive, from a first device, a request for a product; determine, based on the request, a geographic location for delivery of the product, and a delivery time for delivery of the product; identify, based on the request, a plurality of product locations that are located in a geographic region associated with the geographic location, each of the plurality of product locations being a location capable of providing the product; determine, for each of the plurality of product locations and based on the product and at least one product location characteristic, a fulfillment time, the fulfillment time indicating a time at which the product will be at the product location and prepared for delivery; identify, for each of the plurality of product locations, at least one potential courier, each potential courier being capable of transporting the product from the product location to the geographic location; select, based on the fulfillment time, the delivery time, the geographic location for delivery, and at least one courier characteristic associated with the at least one potential courier, a particular product location of the plurality of product locations and a particular courier from the at least one potential courier; and perform an action based on the particular product location or the particular courier.

According to some implementations, a non-transitory computer-readable medium may store instructions, the instructions comprising: one or more instructions that, when executed by one or more processors, cause the one or more processors to: receive, from a first device, a request for a product, the request including: information identifying a geographic location for delivery of the product, and information identifying a delivery time for delivery of the product; identify, based on the request, a plurality of second devices, each second device, of the plurality of second devices, being in a geographic region associated with the geographic location, each second device, of the plurality of second devices, being associated with a location capable of providing the product; determine, for each second device, of the plurality of second devices, and based on at least one product location characteristic, a fulfillment time, the fulfillment time indicating a time at which the product will be prepared for delivery from the location for the second device; select, based on the fulfillment time, the delivery time, and the geographic location for delivery, a particular location of a particular second device of the plurality of second devices; and perform an action based on the particular location.

According to some implementations, a method may comprise: receiving, by a first device and from a second device, a request for a product; determining, by the first device and based on the request, a geographic location for delivery of the product, and a delivery time for delivery of the product; identifying, by the first device and based on the request, a plurality of product locations that are located in a geographic region associated with the geographic location, each of the plurality of product locations being a location capable of providing the product; determining, by the first device, for each of the plurality of product locations, and based on the product and at least one product location characteristic, a fulfillment time, the fulfillment time indicating a time at which the product will be at the product location and prepared for delivery; identifying, by the first device and for each of the plurality of product locations, at least one potential courier, each potential courier being capable of transporting the product from the product location to the geographic location; providing, by the first device and for each of the plurality of product locations, a scheduling model with one of the at least one product location characteristics and at least one courier characteristic associated with one of the at least one potential courier, the scheduling model having been trained to produce, as output, an estimated completion time associated with delivery of the product to the geographic location for delivery; and performing, by the first device, an action based on at least one estimated completion time obtained from the scheduling model.

DETAILED DESCRIPTION

Figure 1A:
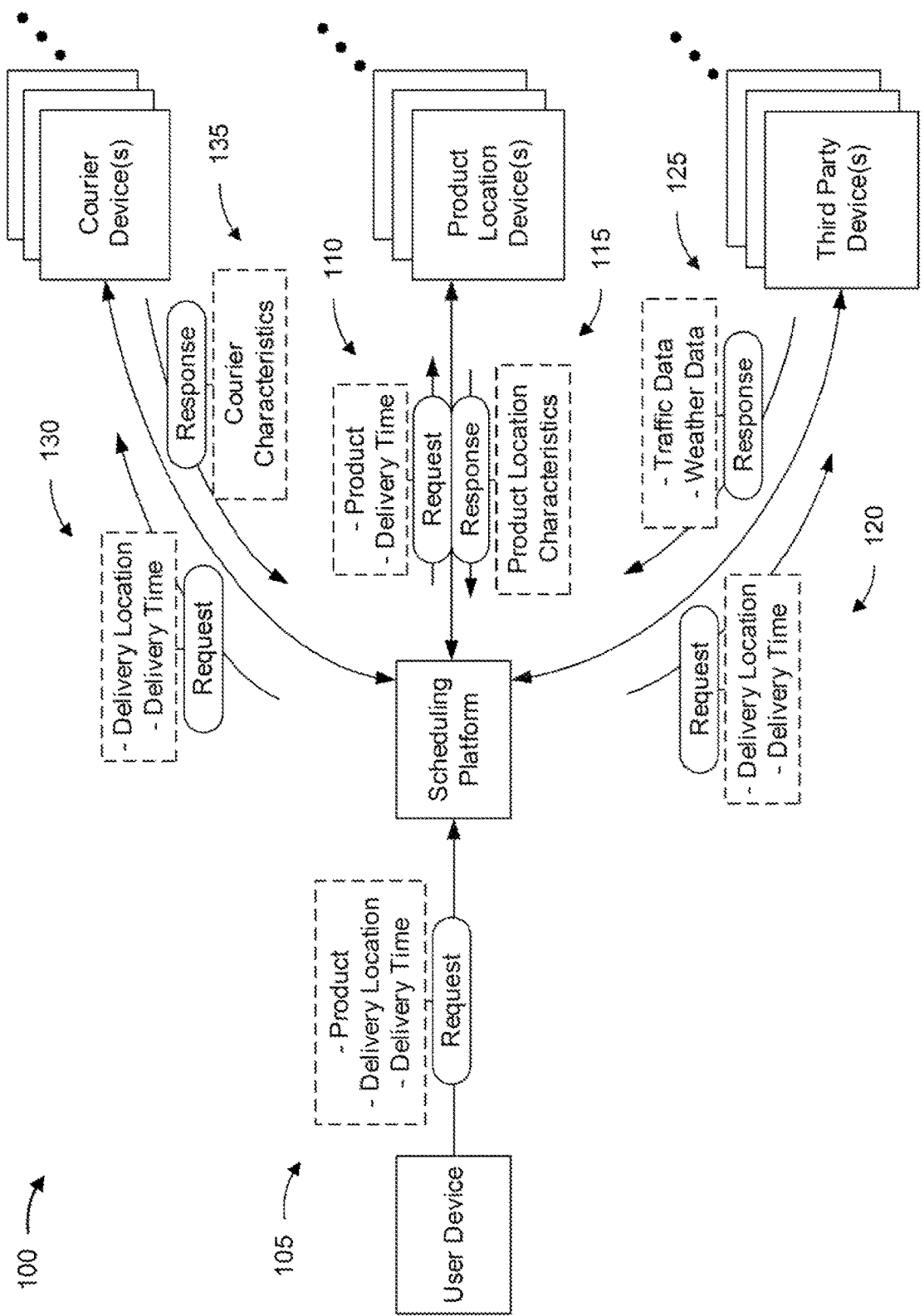
FIGS. 1A-1B are diagrams of an overview of an example implementation described herein.

The following detailed description of example implementations refers to the accompanying drawings. The same reference numbers in different drawings may identify the same or similar elements.

A consumer may receive products via delivery, such as by a courier. Although the consumer may wish to receive the product by a desired time or within a desired time period, product orders are generally processed in an order that the product orders are received, and are generally sent out when a carrier is available or scheduled to make pick-ups and deliveries. As such, it may be difficult for a consumer to specify a time window for delivery in the near future, such as within hours, or a specific time window within days, weeks, etc. of the order or purchase.

Some implementations, described herein, may provide a scheduling platform that gathers data from product location devices (e.g., devices located at area locations that house a product), from courier devices (e.g., devices associated with independent contractors, drones, carriers, or the like), and/or from third party devices (e.g., devices that provide traffic data, weather data, or the like). Using the data gathered, the scheduling platform may schedule delivery of a product to a user specified location within a relatively short window of time (e.g., within a 2 hour window, starting as early as within 2 hours of the product being ordered).

In this way, the scheduling platform may provide an improved user experience. For example, the scheduling platform may provide faster delivery of the product. As another example, the scheduling platform may provide on-demand delivery of the product (e.g., delivery when the user wants the delivery, and delivery scheduled within a specific future window of time). In some implementations, the scheduling platform may allow scheduling of hundreds, thousands, millions, etc., of orders from hundreds thousands, millions, etc., of users.

Furthermore, the scheduling platform may provide situational awareness (e.g., incoming orders, delivery time, weather, traffic, etc.) to product location devices and/or courier devices, to enable the product location devices and/or courier devices to present relevant information to entities that prepare and/or deliver the products.

Additionally, the scheduling platform may use a selective process that identifies devices capable of timely and efficient order processing. This may reduce resource usage of some devices by obviating the need for orders to wait in a queue at the scheduling platform, product location devices, and/or courier devices, which may conserve processing, storage, and network resources. In addition, by selectively sending orders to devices that are associated with entities capable of fulfilling the orders within the user specified time window, delivery bottlenecks may be avoided, and costs associated with delivering products may be reduced (e.g., by selecting a delivery method with a lower cost than another delivery method). In this way, selection of a product location device and/or a courier device may be made in a way that is more efficient than other selection methods in that it may lead to faster order fulfillment, less hardware resource consumption, and lower costs for an entity that prepares and provides products to users.

Figure 1B:
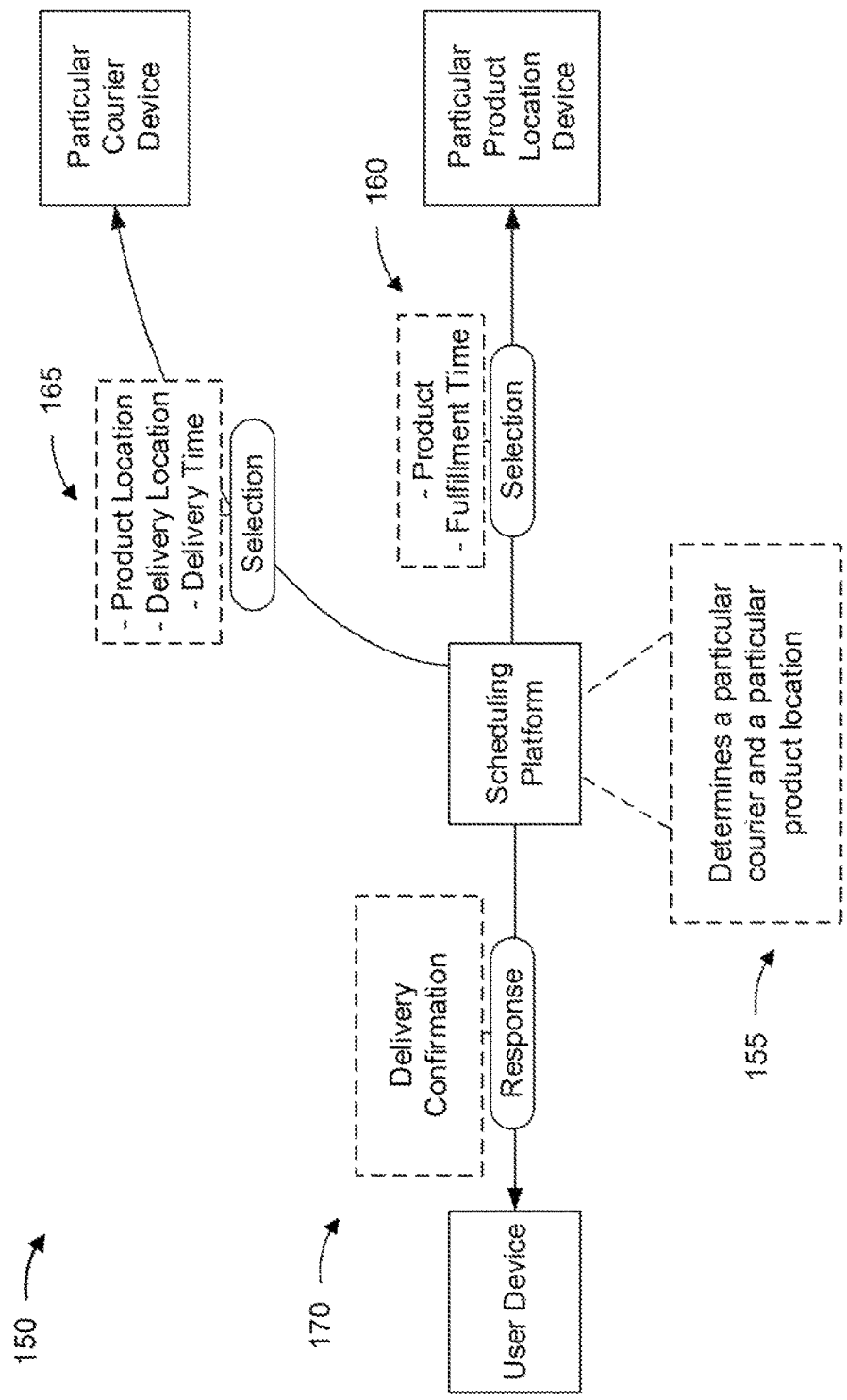

FIGS. 1A-1B are diagrams of an overview of an example implementation 100 described herein. As shown in FIG. 1A, example implementation 100 may include a user device, a scheduling platform, one or more product location device(s), one or more courier device(s), and one or more third party device(s). In some implementations, the scheduling platform may include a cloud computing platform, one or more server devices, or the like. The scheduling platform may be associated with an entity that provides products and/or services to users, such as a user associated with the user device. As one example, the scheduling platform may be associated with a bank that desires to offer quick delivery of banking products (e.g., credit cards, debit cards, cash, cashier's checks, etc.).

In some implementations, the product location devices may include devices located at a physical location that may have products available, such as a warehouse, a retail location, product storage locker, or the like. In some implementations, the courier device(s) may include a device associated with a courier (e.g., an entity capable of delivering a product, such as an independent contractor-based delivery person, a delivery drone, a commercial carrier, or the like), such as a drone control device, a smart phone, a personal computer, a server computer, or the like. In some implementations, the third party devices may include other user devices, server devices, or the like, which are capable of providing relevant information to the scheduling platform.

As shown in FIG. 1A, and by reference number 105, the user device may send, to the scheduling platform, a request for a product. For example, a user of the user device may send a request for a cashier's check to the scheduling platform (e.g., using a banking application operating on the user device). In some implementations, data associated with the request may indicate the product, the location to which the product should be delivered (e.g., an address at which the user is or will be located), and a time at which the product is to be delivered (e.g., a time during which someone will be at home to receive the product).

As further shown in FIG. 1A, and by reference number 110, the scheduling platform may send a request to the product location device(s), such as devices associated with a product location that may have the product in stock and/or may be near the delivery location. As shown by reference number 115, the scheduling platform may receive product location characteristics, such as data indicating which products are in stock at the associated location, which entities are capable of preparing particular products (e.g., for specialized products that need someone specific, like a cashier's check), schedules for those entities, or the like.

As further shown in FIG. 1A, and by reference number 120, a scheduling platform may send, to the third party device(s), a request for information that may affect timing of a delivery. The request may be associated with information that the third party devices(s) can use to obtain and/or determine such information, such as a product location, a delivery time and/or a delivery location. As shown by reference number 125, the scheduling platform may receive, from the third party devices, the information that may affect timing of a delivery, such as traffic data associated with traffic conditions (e.g., current or projected traffic conditions), and/or weather data associated with weather conditions (e.g., current or projected weather conditions), or the like.

As further shown in FIG. 1A, and by reference number 130, the scheduling platform may send, to the courier device(s), a request associated with data specifying the delivery location and the delivery time. In some implementations, the request may also be associated with product location information specifying the product location(s), as a courier may pick up the product at a product location. As shown by reference number 135, the scheduling platform may receive courier characteristics from the courier devices. For example, the courier characteristics may include a cost associated with the courier, a range associated with the courier, availability for the courier, traffic conditions associated with the courier, insurance characteristics associated with the courier, a language spoken by the courier, information relating to the quantity of on-time deliveries that the courier has made, and/or the like.

As shown in FIG. 1B, the data provided to the scheduling platform in the example implementation 100 of FIG. 1A may be used to determine a particular courier device and a particular product location device (e.g., based on the data received by the scheduling platform). Example implementation 150 may include the user device, the scheduling platform, a particular product location device, and a particular courier device. As shown by reference number 155, the scheduling platform may use the information received from the product location device(s), the third party device (s), and/or the courier device(s) to determine a particular courier and a particular product location. The determination may be made in a variety of ways, which is discussed in further detail below.

As further shown in FIG. 1B, and by reference number 160, the scheduling platform may send selection data to the particular product location device. The selection data may be sent based on the selection of the particular product location device (e.g., in response to selection of the particular product location device). The selection data may specify, for example, the product and a fulfillment time (e.g., a time that the product needs to be prepared for pickup by a courier associated with the particular courier device). The selection data may, in some implementations, include or be associated with other data designed to enable the product to be prepared by the fulfillment time.

As further shown in FIG. 1B, and by reference number 165, the scheduling platform may send selection data to the particular courier device. The selection data may be sent based on the selection of the particular courier device (e.g., in response to selection of the particular product location device). The selection data may include, for example, the product location, delivery location, and delivery time (e.g., enabling the carrier to pick up the product from the product location and deliver it to the user by or within the delivery time). As further shown in FIG. 1B, and by reference number 170, the scheduling platform may send a delivery confirmation to the user device, e.g., in a manner designed to confirm when and/or how the product will be delivered.

In this way, the scheduling platform may provide an improved user experience. For example, the scheduling platform may provide quick delivery of the product. As another example, the scheduling platform may provide on-demand delivery of the product (e.g., delivery when the user wants the delivery, and delivery scheduled within a specific future window of time). In some implementations, the scheduling platform may allow scheduling of hundreds, thousands, millions, etc., of orders from hundreds thousands, millions, etc., of users.

Furthermore, the scheduling platform may provide situational awareness (e.g., incoming orders, delivery time, weather, traffic, etc.) to product location devices and/or courier devices, to enable the product location devices and/or courier devices to present relevant information to entities that prepare and/or deliver the products.

Additionally, the scheduling platform may use a selective process that identifies devices capable of timely and efficient order processing. This may reduce resource usage of some devices by obviating the need for orders to wait in a queue at the scheduling platform, product location devices, and/or courier devices, which may conserve processing, storage, and network resources. In addition, by selectively sending orders to devices that are associated with entities capable of fulfilling the orders within the user specified time window, delivery bottlenecks may be avoided, and costs associated with delivering products may be reduced (e.g., by selecting a delivery method with a lower cost than another delivery method). In this way, selection of a product location device and/or a courier device may be made in a way that is more efficient than other selection methods in that it may lead to faster order fulfillment, less hardware resource consumption, and lower costs for an entity that prepares and provides products to users.

As indicated above, FIGS. 1A-1B are provided merely as an example. Other examples are possible and may differ from what was described with regard to FIGS. 1A-1B.

Figure 2:
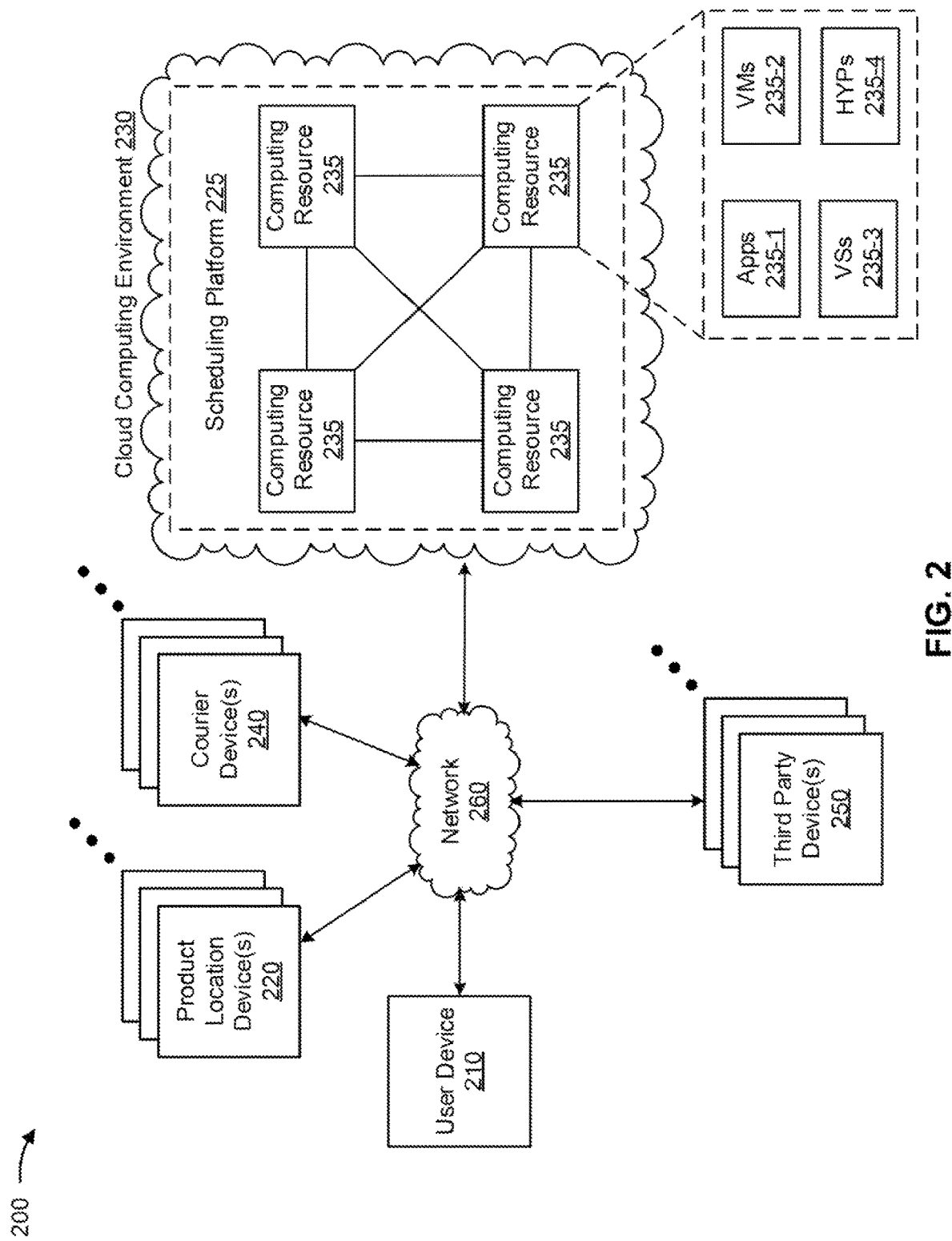
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, product location device(s) 220, scheduling platform 225 hosted within a cloud computing environment 230, courier device(s) 240, and third party device(s) 250. Devices of environment 200 may interconnect via wired connections, wireless connections, or a combination of wired and wireless connections.

User device 210 includes one or more devices capable of receiving, generating, storing, processing, and/or providing information associated with requests for products. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may include one or more applications for ordering products, such as a web browsing application for ordering products from a website, a scheduling platform application associated with scheduling platform 225 for ordering products from an entity associated with scheduling platform 225, or the like.

Product location device(s) 220 include one or more devices capable of receiving, generating, storing, processing, and/or providing information associated with products, including product availability and preparation times. For example, product location device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Product location device 220 may be associated with a product location (e.g., a location that houses products, which an entity associated with the product location can prepare for delivery to a user). In some implementations, product location device 220 may be associated with one or more entities associated with a product location (e.g., product location device 220 may be associated with a particular person at a product location, a particular piece of equipment at a product location, or the like). By way of example, product location device 220 may be a wearable communication device worn by a person capable of preparing a particular product or products for delivery. As another example, product location device 220 may be a computing device connected to a device for preparing products, such as a cashier's check printer capable of preparing cashier's checks for delivery.

Scheduling platform 225 includes one or more devices capable of receiving, generating, storing, processing, and/or providing information associated with scheduling the preparation and delivery of products. While the example environment 200 indicates that scheduling platform 225 is implemented in a cloud computing environment 230, in some implementations, scheduling platform 225 may be implemented by one or more other types of devices as well, such as a server computer, laptop computer, tablet computer, handheld computer, or the like. Scheduling platform 225 is capable of using data provided by user device 210, product location device(s) 220, courier device(s) 240, and/or third party device(s) 250 to schedule the preparation and delivery of a product. Scheduling platform 225 may, in some implementations, include or otherwise have access to other resources to facilitate scheduling preparation and delivery of products, including resources for generating models via machine learning, resources for storing historical preparation and delivery data, or the like.

Cloud computing environment 230 includes an environment that delivers computing as a service, whereby shared resources, services, etc. may be provided to schedule preparation and delivery of products. Cloud computing environment 230 may provide computation, software, data access, storage, and/or other services that do not require end-user knowledge of a physical location and configuration of a system and/or a device that delivers the services. As shown, cloud computing environment 230 may include scheduling platform 225 and computing resource 235.

Computing resource 235 includes one or more personal computers, workstation computers, server devices, or another type of computation and/or communication device. In some implementations, computing resource 235 may host scheduling platform 225. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with scheduling platform 225 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Courier device(s) 240 include one or more one or more devices capable of receiving, generating, storing, processing, and/or providing information associated with products, including product pickup and delivery times. For example, courier device 240 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Courier device 240 may be associated with a courier (e.g., an entity capable of picking up a product from a product location and delivering the product to a delivery location). In some implementations, courier device 240 may be associated with one or more entities capable of delivering a product (e.g., courier device 240 may be associated with a drone fleet management device, courier service server device, carrier server device, or the like). By way of example, courier device 240 may be a smart phone owned by a person capable of picking up a product from a product location and delivering that product to a delivery location. As another example, courier device 240 may be a drone fleet management device capable of scheduling and deploying drones to pick up and/or deliver products.

Third party device(s) 250 include one or more one or more devices capable of receiving, generating, storing, processing, and/or providing information associated with scheduling preparation and delivery of products. For example, third party device 250 may include a communication and/or computing device, such as a server computer, mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Third party device 250 may be capable of providing a variety of information upon request. For example, third party device 250 may be associated with a weather server, which may provide weather-related information (e.g., current conditions, forecasted conditions, or the like) for particular geographic areas. As another example, third party device 250 may be associated with a traffic server, which may provide traffic-related information (e.g., automobile traffic, air traffic, or the like) for particular geographic areas and/or routes.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
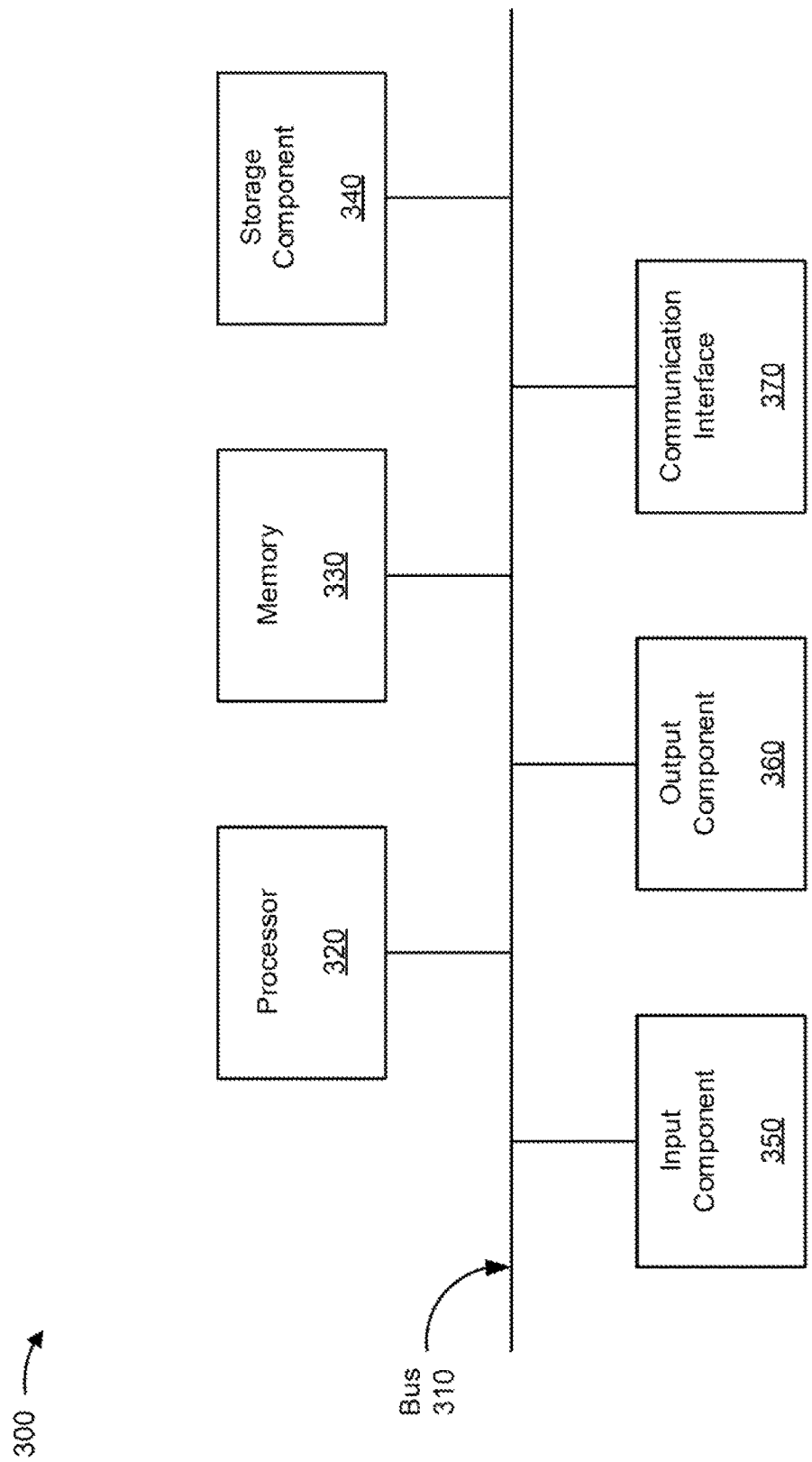
FIG. 3 is a diagram of example components of one or more devices of FIG. 2.

FIG. 3 is a diagram of example components of a device 300. Device 300 may correspond to user device 210, product location device 220, scheduling platform 225 hosted within a cloud computing environment 230, courier device 240, and/or third party device 250. In some implementations, user device 210, product location device 220, scheduling platform 225 hosted within a cloud computing environment 230, courier device 240, and/or third party device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
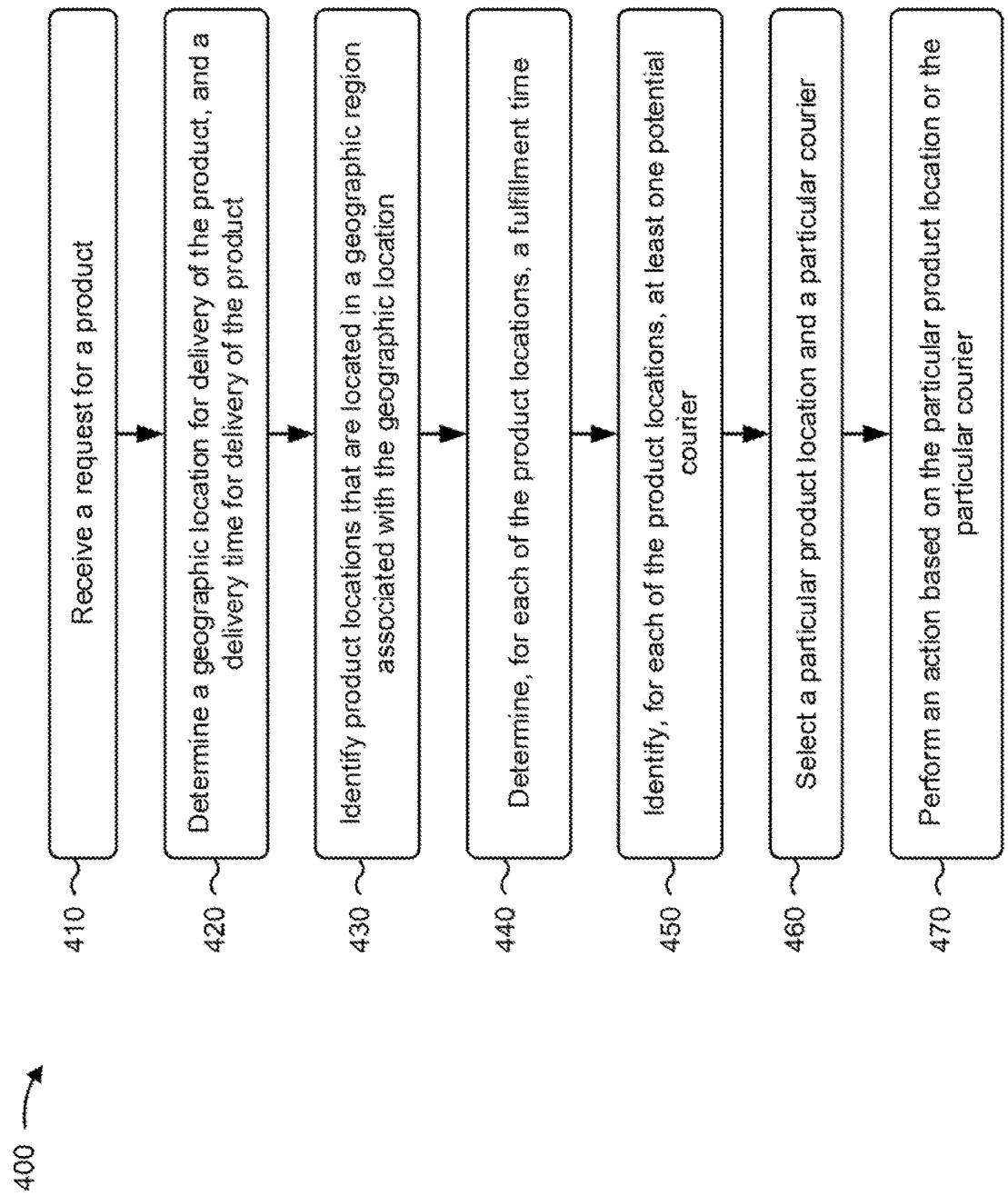
FIG. 4 is a flow chart of an example process for scheduling product preparation and delivery.

FIG. 4 is a flow chart of an example process 400 for scheduling product preparation and delivery. In some implementations, one or more process blocks of FIG. 4 may be performed by scheduling platform 225 hosted within a cloud computing environment 230. In some implementations, one or more process blocks of FIG. 4 may be performed by another device or a group of devices separate from or including scheduling platform 225, such as user device 210, product location device(s) 220, courier device(s) 240, and/or third party device(s) 250. While portions of the following description use examples related to the delivery of a financial product, implementations described herein are equally applicable to other types of product deliveries, such as, food deliveries, electronics deliveries, clothing deliveries, deliveries of services personnel, or the like.

As shown in FIG. 4, process 400 may include receiving a request for a product (block 410). For example, scheduling platform 225 may receive a request for a product from user device 210, e.g., via network 260. User device 210 may send the request in a variety of ways, e.g., using an application operating on user device 210, including a communications application, ordering application associated with scheduling platform 225, web browsing application, or the like. In some implementations, the request may originate from scheduling platform 225 automatically, e.g., in response to user device 210 communicating preferences for periodic ordering of a product and/or product ordering in response to occurrence of a particular event.

In some implementations, the product may be a financial product, such as a credit card, a debit card, cash, a cashier's check, or the like. In some implementations, the request may indicate or be associated with data identifying the product, a delivery location to which the product is to be delivered, and/or a time at which the product is to be delivered. For example, the request may be sent with GPS data identifying a location of user device 210, and the location identified by the GPS data may be the delivery location. As another example, a user of user device 210 may provide input indicating a delivery location, such as a street address. The delivery time may be, for example, a specific date/time or a window of time on a particular date, and in some implementations the delivery time may be immediate (e.g., user is requesting the product be delivered as soon as possible).

In this way, scheduling platform 225 may receive a request for a product, enabling scheduling platform 225 to determine a geographic location for delivery of the product and a delivery time for delivery of the product.

As further shown in FIG. 4, process 400 may include determining a geographic location for delivery of the product, and a delivery time for delivery of the product (block 420). For example, scheduling platform 225 may determine a geographic location for delivery of the product (e.g., a delivery location), and scheduling platform 225 may determine a delivery time for delivery of the product. The delivery location and the delivery time may be determined, for example, based on data associated with the request provided by user device 210.

As noted above, in some implementations, scheduling platform 225 may determine the delivery location based on geo-location information (e.g., GPS data) that is provided by user device 210 and/or manually input by the user. Additionally, or alternatively, scheduling platform 225 may determine the delivery location based on address information, such as a home address of a user of user device 210 (e.g., stored on user device 210, previously obtained and stored by scheduling platform 225, or the like).

In some implementations, the delivery location may be non-static, and/or dynamically updated (e.g., in a situation where the delivery is to be made to a location associated with a moving user device 210). For example, user device 210 sensor data (e.g., GPS, Wi-Fi, Bluetooth, camera, or the like) may be periodically provided to scheduling platform 225, enabling scheduling platform 225 to determine where user device 210 is located during the product preparation and delivery process. This may enable scheduling platform 225 to more accurately enable delivery of the product to a location of user device 210. In some implementations, scheduling platform 225 may use user device 210 sensor data to determine a speed and direction of travel for user device 210 (e.g., in a manner designed to predict where user device 210 will be located). Additionally, or alternatively, scheduling platform 225 may notify user device 210 based on the sensor data (e.g., by providing user device 210 with a prompt regarding delivery to user device 210 or to a specific location of the user's choosing). Notifications may be sent to user device 210, for example, to confirm a delivery location (e.g., for every delivery, or based on particular events, such as when scheduling platform 225 lacks confidence in location prediction based on, for example, user device 210 speed meeting a threshold.

In some implementations, scheduling platform 225 may determine the delivery time based on a time specified by a user of user device 210. For example, the user may specify a particular time, such as a target time, a latest possible time, an earliest possible time, or the like. As another example, the user may specify a window of time, such as between an earliest possible time and a latest possible time. As another example, the user may specify guidance, a rule, a priority, or the like, such as "as soon as possible". In some implementations, scheduling platform 225 may provide, to a device (e.g., user device 210), data indicating available delivery times, and may receive, from the device, a selection from the available delivery times. In this situation, scheduling platform 225 may determine the delivery time based on the selection from the available delivery times.

In this way, scheduling platform 225 may determine a geographic location for delivery of the product and a delivery time for delivery of the product, enabling scheduling platform 225 to identify product locations that are located in a geographic region associated with the geographic location.

As shown in FIG. 4, process 400 may include identifying a product location based on the request (block 430). For example, scheduling platform 225 may identify product locations that are located in a geographic region associated with the delivery location. Product locations are locations where products may be housed, such as a retail location, warehouse location, storage locker location, or the like.

In some implementations, scheduling platform 225 may identify product locations that may have (or will have) the requested product. For example, scheduling platform 225 may identify product locations that have the product based on inventory data available to scheduling platform 225, which may include product distribution data that indicates when a product location is to receive products. In some implementations, scheduling platform 225 may identify product locations based on requesting information, such as inventory data and/or product distribution data, from product location devices. Additionally, or alternatively, scheduling platform 225 may identify product locations based on information, such as inventory data and/or product distribution data, previously stored by or otherwise accessible to scheduling platform 225. In some implementations, a product location may be mobile (e.g., a mobile retail location or mobile product storage location). In this situation, scheduling platform 225 may identify product locations based on sensor data associated with product location devices 220. For example, based on GPS, Wi-Fi, Bluetooth, or camera data from a product location device 220, scheduling platform may determine the location of the corresponding product location.

In some implementations, scheduling platform 225 may identify product locations within a geographic region based on a threshold distance associated with the product location. For example, the threshold distance for the product location may be based on a range characteristic associated with the product location and/or a range characteristic of at least one potential courier associated with the product location. By way of example, a particular product location may be associated with multiple potential couriers (e.g., entities capable of delivering a product from the particular product location). In some situations, the potential couriers may be associated with a range characteristic (e.g., a maximum delivery range from the product location), and scheduling platform 225 may use the range characteristics to determine a threshold distance for the particular product location. For example, scheduling platform 225 may use, as the threshold distance associated with the particular product location, a mean, median, or maximum range from the potential couriers associated with the particular product location. As another example, the threshold distance may be predetermined for a product location or product locations.

In some implementations, scheduling platform 225 may identify a product location that includes a product preparing location associated with one or more entities capable of preparing the product for delivery. A product preparing location may be, for example, a retail location having equipment and/or people that are capable of preparing a product. For example, a bank branch location may include equipment for printing a cashier's check and personnel capable of authorizing the issuance of a cashier's check and packaging the cashier's check in an appropriate manner for delivery. Additionally, or alternatively, scheduling platform 225 may identify a product location that includes a storage location storing the product. For example, a storage location may include a storage locker or warehouse location that houses products which, in some implementations, may be pre-packaged for delivery. In this situation, the product may have been prepared for delivery prior to receipt of the request for the product and left at the storage location for later pickup and delivery by a courier.

In this way, scheduling platform 225 may identify product locations that are located in a geographic region associated with the delivery location, enabling scheduling platform 225 to determine a fulfillment time for each of the product locations.

As shown in FIG. 4, process 400 may include determining, for each of the product locations, a fulfillment time (block 440). For example, scheduling platform 225 may determine, for each of the product locations, a fulfillment time. In some implementations, the fulfillment time may indicate a time at which the product will be at the product location and prepared for delivery. For example, the fulfillment time may be based on the amount of time required for the product to be identified, prepared, generated, retrieved, reviewed, approved, packaged, or the like.

In some implementations, scheduling platform 225 may determine the fulfillment time based on product location characteristics. The product location characteristics may specify a variety of information for a particular product location, such as data regarding entities capable of preparing products for delivery, data regarding the availability of the entities, data indicating the products available at the particular product location, or the like. For example, a product location characteristic may include data indicating one or more qualified product providers that are associated with the product location. Each qualified product provider may include an entity capable of preparing, at the product location, the product for delivery. For example, a printing device, packaging device, and an employee may each be a qualified product provider of one or more different types of products. Another example product location characteristic may include data indicating availability for the qualified product providers at the product location. For example, scheduling platform 225 may obtain or otherwise have access to schedules, work queues, or the like, which are associated with the qualified product providers at a particular product location. As another example, a product location characteristic may specify, for a particular product location, data indicating products available at the product location (e.g., product inventory data, which may include future inventory and/or inventory forecasts).

In some implementations, scheduling platform 225 may receive input from a proximity detection device to determine one or more product location characteristics, such as the availability of an entity capable of preparing products for delivery at a particular product location. For example, a product location may be associated with a proximity detection device (e.g., a Wi-Fi device, Bluetooth device, proximity sensor, or the like), which may detect, and in some implementations identify, an individual that enters within range of the proximity detection device. For example, an individual may use a wearable device (e.g., a type of product location device 220), which is equipped with a Bluetooth communications component, which enables a Bluetooth proximity detection device to identify and determine when the wearable device (and the individual wearing it) is within range. The proximity detection device may provide scheduling platform 225 with data indicating the availability of an individual or individuals based on the detection of one or more individuals within range. Using the foregoing information, scheduling platform 225 may determine whether an individual is available to prepare a particular product.

Scheduling platform 225 may use one or more of the product location characteristics to determine the fulfillment time in a variety of ways. Using the cashier's check example, scheduling platform 225 may obtain, from product location device 220 associated with a bank branch, the schedule or availability of one or more employees capable of authorizing a cashier's check, data indicating the availability of blank cashier's checks, and data indicating the availability of a printing device for printing the cashier's check. Using the foregoing information, scheduling platform 225 may determine the fulfillment time.

In some implementations, scheduling platform 225 may have access to previous fulfillment times and/or predetermined fulfillment times associated with a product location and/or product location characteristics. In this situation, the previous fulfillment times and/or predetermined fulfillment times may be used to determine the fulfillment time for preparing a product for delivery. By way of example, scheduling platform 225 may have access to historical data (or, in some implementations, a predetermined fulfillment time) indicating that a cashier's check takes thirty minutes to prepare for delivery. In this situation, the fulfillment time may be determined to be thirty minutes. In some implementations, scheduling platform 225 may use a machine learning model to determine the fulfillment time. For example, a model may be trained, using previous product orders, fulfillment times, and product location characteristics, to provide an estimated fulfillment time. In this situation, scheduling platform 225 may provide, as input to the model, data indicating one or more product location characteristics and receive, from the model, an estimated fulfillment time.

In this way, scheduling platform 225 may determine a fulfillment time for each of the product locations, enabling scheduling platform 225 to identify at least one potential courier for each of the product locations.

As shown in FIG. 4, process 400 may include identifying, for each of the product locations, at least one potential courier (block 450). For example, scheduling platform 225 may identify, for each of the product locations, at least one potential courier. In some implementations, each potential courier may include an entity capable of transporting the product from the product location to the delivery location. For example, a potential courier may be an independent contractor based delivery person, a drone, a commercial carrier, or the like.

In some implementations, scheduling platform 225 may identify at least one potential courier based on obtaining courier characteristics. For example, courier characteristics may include data indicating a cost associated with a courier, data indicating a range associated with a courier, data indicating availability for a courier, data indicating traffic conditions associated with a courier, data indicating a language or languages spoken by the courier, data relating to previous deliveries by the courier, data indicating insurance characteristics associated with a courier, and/or the like. Scheduling platform 225 may obtain courier characteristics in a variety of ways. For example, courier characteristics may be stored by or otherwise accessible to scheduling platform 225, courier characteristics may be requested from a predefined list of couriers, or scheduling platform 225 may broadcast, in a geographic region near the product location and/or delivery location, a request for courier characteristics.

In some implementations, scheduling platform 225 may identify a potential courier based on the range associated with the potential courier (e.g., a courier may be identified as a potential courier if it is capable of picking up a product from the product location and delivering it to the delivery location). In some implementations, scheduling platform 225 may identify a potential courier based on data indicating availability for the potential courier (e.g., a courier may not be a potential courier if the courier is otherwise engaged or otherwise unable to deliver a product within the requested time window). In some implementations, scheduling platform 225 may identify a potential courier based on an insurance characteristic, or insurance policy, associated with the potential courier (e.g., for some products, scheduling platform 225 may require a particular type of insurance for a courier to be eligible to be a potential courier). As noted above, other courier characteristics (such as the cost of a courier or traffic conditions on a delivery route) may be used, alone or in combination with each other or any of the above courier characteristics, to identify at least one potential courier.

Scheduling platform 225 may, in some implementations, identify at least one potential courier for only one of the product locations (e.g., in some situations only one combination of product location and potential courier may be capable of fulfilling and delivering a particular product). In some implementations, a single potential courier may be identified as a potential courier for multiple product locations. For example, an independent contractor based delivery service may have individuals capable of delivering products in a geographic area that includes multiple product locations. In this situation, the courier characteristics may vary based on the product location from which the courier will pick up the product (e.g., the cost associated with courier delivery, traffic associated with courier delivery, and/or insurance characteristics might change based on the product location).

In this way, scheduling platform 225 may identify at least one potential courier for each of the product locations, providing scheduling platform 225 with situational awareness regarding potential couriers that may be available to deliver products for one or more of the product locations. Identifying at least one potential courier may further enable scheduling platform 225 to select a particular product location and particular courier.

As shown in FIG. 4, process 400 may include selecting a particular product location and a particular courier (block 460). For example, scheduling platform 225 may select a particular product location and particular courier. In some implementations, scheduling platform 225 may select the particular product location and/or the particular courier based on information obtained from user device 210, product location device(s) 220, courier device(s) 240, and/or third party device(s) 250. For example, scheduling platform 225 may select the particular product location and/or the particular courier based on the delivery time, the delivery location, at least one courier characteristic associated with at least one potential courier, at least one product location characteristic associated with at least one product location, and/or data provided from a third party device (e.g., traffic information, weather information, or the like). In some implementations, as described above, a delivery location and/or a product location may be dynamic (e.g., estimated by scheduling platform 225 and/or periodically updated by a corresponding user device 210 and/or product location device 220).

In some implementations, scheduling platform 225 may select the particular product location and/or the particular courier by providing information obtained from user device 210, product location device(s) 220, courier device(s) 240, and/or third party device(s) 250 to an artificial intelligence model (e.g., a machine learning model) trained to select a product location and/or a courier based on the obtained information (e.g., delivery location, delivery time, product location, fulfillment time, product location characteristics, courier characteristics, or the like). For example, scheduling platform 225 may provide, for each of the product locations, a scheduling model with at least one product location characteristic associated with a product location and at least one courier characteristic associated with a potential courier. In this situation, the scheduling model may have been trained to produce, as output, an estimated completion time associated with delivery of the product to the delivery location. In some implementations, the scheduling model may be trained to produce, as output, an estimated cost associated with delivery of the product to the delivery location.

In some implementations, the scheduling model may be trained to produce, as output, a score that provides a measure with which scheduling platform 225 may evaluate a particular combination of a particular product location and particular courier. For example, the scheduling model may produce a score for a combination of product location and potential courier, the score being based on input data indicating courier cost, courier ability to deliver on time, fulfillment time associated with the product location, or the like. Scores output from the scheduling model may be compared and/or ranked to determine the particular product location from which the requested product will be prepared and to determine the particular courier that will pick up the requested product from the product location and deliver it to the delivery location. Other types of machine learning models may be used by scheduling platform 225 to facilitate selection of a particular product location and/or a particular courier. In some implementations, selection may be automatic (e.g., based on highest ranked machine learning scores or the like), and in some implementations, selection may be made by a user associated with scheduling platform (e.g., scheduling platform 225 may receive input from user selecting the particular product location and particular courier).

In this way, scheduling platform 225 may select a particular product location and particular courier, enabling scheduling platform 225 to perform an action based on the particular product location or the particular courier.

As shown in FIG. 4, process 400 may include performing an action based on the particular product location or the particular courier (block 470). For example, scheduling platform 225 may perform an action based on the particular product location and/or the particular courier. The actions performed may vary, and in some implementations, multiple actions may be performed. Some example actions are designed to facilitate timely (e.g., quick and/or within a particular time) fulfillment (e.g., preparation and packaging) and delivery of a product to the delivery location specified by the user.

In some implementations, scheduling platform 225 may provide, to product location device 220 associated with the particular product location, data specifying the product, the fulfillment time, and/or the particular courier. For example, data provided to product location device 220 may enable product location device 220 (and/or an entity associated with product location device 220) to prepare the product within the fulfillment time.

In some implementations, scheduling platform 225 may provide, to courier device 240 associated with the particular courier, data specifying the product, the fulfillment time, the particular product location, delivery time, and/or the delivery location. For example, data provided to courier device 240 may enable courier device 240 (and/or the particular courier associated with courier device 240) to pick up the product at the fulfillment time and particular product location, and to deliver the product to the delivery location at the delivery time.

In some implementations, scheduling platform 225 may provide, to another device (e.g., user device 210), data specifying the particular product location and/or the particular courier. In some implementations, data specifying other information (e.g., in addition to or alternatively to the particular product location and/or the particular courier) may be provided to another device. For example, scheduling platform 225 may send user device 210 a response to the product request, and the response may indicate a variety of information related to the product request, such as the particular courier delivering the requested product, the delivery time, the particular product location, or the like. As another example, scheduling platform 225 may send information, such as a cost associated with the product and/or particular courier, to a payment processor associated with user device 210 (e.g., in a manner designed to charge or credit a user account associated with user device 210). As yet another example, various pieces of information may be provided to a machine learning model training device (e.g., in a manner designed to update an existing model and/or generate a new model to facilitate scheduling product preparation and delivery).

In some implementations, scheduling platform 225 may perform an action to determine at least two delivery options. For example, in addition to selecting a particular product location and a particular courier, scheduling platform may select one or more other product locations and/or one or more other couriers (e.g., based on product location characteristics, courier characteristics, scheduling model results, or the like). In this situation, each delivery option may be associated with one of the product locations and/or at least one potential courier. As an example, scheduling platform 225 may determine the delivery options based on estimated delivery times associated with preparation and delivery of the product to the delivery location from various combinations of product location and courier.

In some implementations, scheduling platform 225 may determine delivery options by obtaining third party data from at least one third party device and determining the delivery options based on the third party data. For example, the third party data may include data specifying weather conditions associated with the geographic region, and/or data specifying traffic conditions associated with the geographic region. In some implementations, scheduling platform 225 may provide an artificial intelligence model (e.g., the scheduling model described above) with at least a portion of the third party data, (e.g., in a manner designed to obtain a score or other measure which may be used to determine whether a combination of product location and courier is a delivery option).

In some implementations, when determining at least two delivery options, scheduling platform 225 may provide another device (e.g., user device 210) with data identifying the delivery options, and may receive, from the other device, a selection of one of the delivery options. For example, scheduling platform 225 may send, to user device 210, data that presents multiple delivery options for the user of user device 210. The user of user device 210 may select one of the delivery options via a user interface on user device 210, causing user device 210 to transmit the selection to scheduling platform 225. In this situation, scheduling platform 225 may use the selection provided by the user to select the product location and courier to prepare and deliver the product.

While a variety of example actions are described above, scheduling platform 225 may be capable of performing a variety of actions designed to facilitate scheduling preparation and delivery of a product. In this way, scheduling platform 225 may perform an action based on the particular product location or the particular courier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As a particular example of process 400, scheduling platform 225 may include a platform utilized by a bank that desires to offer quick delivery of banking products (e.g., credit cards, debit cards, cash, cashier's checks, or the like) that might require some preparation by banking devices and/or banking personnel. In this situation, a user of user device 210 may send a request for a cashier's check to scheduling platform 225, such as while using a banking application operating on user device 210. The request may include a geographic location for delivery (e.g., a home address of the user). Additionally, the user may request delivery of the cashier's check at a particular time, such as when the user will be home, or as soon as possible.

Continuing with the example, scheduling platform 225 may identify product locations (e.g., bank branches, ATMs, warehouse locations, storage lockers, or the like) that might have the requested product. In this situation, scheduling platform 225 may narrow down the product locations to product locations that have cashier's checks in stock, and that have the banking equipment and/or personnel to prepare a cashier's check. For example, based on this criteria, scheduling platform 225 may narrow down the product locations to three nearby bank locations (e.g., different banks, different branch locations of a same bank, or the like).

Continuing with the example, scheduling platform 225 may determine a fulfillment time for the product locations (e.g., a time that the cashier's check will be ready for pickup by a courier). The fulfillment time may depend on how long the cashier's check takes to print, how busy the bank location is, how busy the equipment/personnel used to prepare the cashier's check is, or the like. By way of example, scheduling platform 225 may use a machine learning model to determine an estimated fulfillment time based on various product location characteristics. Scheduling platform 225 may then identify multiple potential couriers for the product locations (e.g., the bank locations), such as a drone delivery option from one of the bank locations, a courier service for another one of the bank locations, and a carrier service for another one of the bank locations.

Continuing with the example, scheduling platform 225 may select one of the product locations (e.g., bank locations) and one of the delivery options based on factors such as the fulfillment time, cost of a courier, ability for a courier to meet a delivery time, or the like. As a specific example, traffic (e.g., a measurement of traffic that satisfies a threshold) may disqualify a courier or a bank location, even in a situation where the disqualified courier is closer to the product location and/or delivery location than other couriers. As another example, a drone delivery option may be disqualified based on weather conditions (e.g., in a situation where visibility does not meet a visibility threshold). Upon selecting a particular product location (e.g., bank location), scheduling platform 225 may perform an action by sending a notification to a courier regarding the fulfillment time, delivery location, and delivery time, sending instructions to a product location device at a bank location to initiate preparation of the cashier's check, and sending confirmation data regarding the product deliver to user device 210 associated with the request. In this way, scheduling platform 225 may use process 400 to schedule preparation and delivery of a product.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. As used herein, the term "or the like" is intended to be inclusive (e.g., as in "and/or the like"), unless explicitly stated otherwise. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive, from a user device via a user interface, a request for a product;
   determine, based on geo-location information of the user device, a geographic location for delivery of the product;
   receive information from a proximity detection device to determine at least one product location characteristic;
   determine, based on the at least one product location characteristic, a fulfillment time indicating a time at which the product will be at a product location and prepared for delivery;
   identify, based on determining the fulfillment time, at least one potential courier;
   select, based on the fulfillment time, the geographic location for delivery, and at least one courier characteristic associated with the at least one potential courier, a particular delivery option;
   provide, to the user device, information identifying the particular delivery option; and
   provide, to a courier device associated with the particular delivery option, data identifying at least one of the product, the fulfillment time, the product location, or the geographic location for delivery.

2. The device of claim 1, wherein the geo-location information is determined based on an input associated with the user device.

3. The device of claim 1, wherein the geographic location for delivery is dynamically updated.

4. The device of claim 1, wherein the one or more processors are further to:
   provide, to the user device, a notification to confirm the geographic location for delivery.

5. The device of claim 1, wherein the information from the proximity detection device comprises:
   information indicating that a wearable device is within a threshold range of the proximity detection device.

6. The device of claim 1, wherein the one or more processors, when determining the fulfillment time, are configured to:
   determine the fulfillment time based on a previous fulfillment time associated with at least one of the product location or the at least one product location characteristic.

7. The device of claim 1, wherein the at least one product location characteristic comprises one or more of:
   data indicating which products are in stock at the product location,
   data indicating which entities are capable of preparing the products, or
   schedules for the entities.

8. A method, comprising:
   receiving, by a device, a request for a product;
   determining, by the device and based on geo-location information, a geographic location for delivery of the product;
   receiving, by the device, information from a proximity detection device to determine at least one product location characteristic;

determining, by the device and based on the at least one product location characteristic, a fulfillment time indicating a time at which the product will be at a product location and prepared for delivery;
identifying, by the device and based on determining the fulfillment time, at least one potential courier;
selecting, by the device and based on the fulfillment time, the geographic location for delivery, and at least one courier characteristic associated with the at least one potential courier, a particular delivery option; and
providing, by the device and to a courier device associated with the particular delivery option, data identifying at least one of the product, the fulfillment time, the product location, or the geographic location for delivery.

9. The method of claim 8, wherein determining the fulfillment time comprises:
determining the fulfillment time based on a predetermined fulfillment time associated with at least one of the product location or the at least one product location characteristic.

10. The method of claim 8, wherein determining the fulfillment time comprises:
determining, using a machine learning model, the fulfillment time.

11. The method of claim 8, wherein identifying the at least one potential courier comprises:
identifying, based on obtaining courier characteristic information, the at least one potential courier.

12. The method of claim 8, wherein the information identifying the particular delivery option identifies the product location and a particular courier of the at least one potential courier.

13. The method of claim 8, wherein selecting the particular delivery option comprises:
selecting the particular delivery option based on data provided from a third party device.

14. The method of claim 8, further comprising:
providing information regarding the fulfillment time, the geographic location for delivery, and the at least one courier characteristic to an artificial intelligence model; and
wherein selecting the particular delivery option comprises:
selecting the particular delivery option based on providing the information regarding the fulfillment time, the geographic location for delivery, and the at least one courier characteristic to the artificial intelligence model.

15. A non-transitory computer-readable medium storing a set of instructions, the set of instructions comprising:
one or more instructions that, when executed by one or more processors of a device, cause the device to:
determine, based on geo-location information, a geographic location for delivery of a product;
receive information from a proximity detection device to determine at least one product location characteristic;
determine, based on the at least one product location characteristic, a fulfillment time indicating a time at which the product will be at a product location and prepared for delivery;
identify, based on determining the fulfillment time, at least one potential courier;
select, based on the fulfillment time, the geographic location for delivery, and at least one courier characteristic associated with the at least one potential courier, a particular delivery option; and
provide, to a courier device associated with the particular delivery option, data identifying at least one of the product, the fulfillment time, the product location, or the geographic location for delivery.

16. The non-transitory computer-readable medium of claim 15, wherein the one or more instructions further cause the device to:
provide information regarding the fulfillment time, the geographic location for delivery, and the at least one courier characteristic to a scheduling model; and
receive, from the scheduling model, one or more scores associated with one or more delivery options; and
wherein the one or more instructions, that cause the device to select the particular delivery option, further cause the device to:
select the particular delivery option based on the one or more scores.

17. The non-transitory computer-readable medium of claim 15, wherein the one or more instructions further cause the device to:
provide information regarding the selection of the particular delivery option to a machine learning model training device.

18. The non-transitory computer-readable medium of claim 15, wherein the one or more instructions further cause the device to:
select the particular delivery option based on data provided from a third party device.

19. The non-transitory computer-readable medium of claim 15, wherein the one or more instructions further cause the device to:
periodically receive an updated geographic location for delivery; and
wherein the one or more instructions, that cause the device to select the particular delivery option, further cause the device to:
select the particular delivery option based on the updated geographic location for delivery.

20. The non-transitory computer-readable medium of claim 15, wherein the one or more instructions further cause the device to:
receive, from a user device, a request for the product; and
receive information regarding a speed and direction of travel associated with the user device; and
wherein the one or more instructions, that cause the device to determine the geographic location for delivery of the product, further cause the device to:
determine the geographic location for delivery of the product based on the information regarding the speed and direction of travel associated with the user device.

* * * * *